Feb. 10, 1959  R. D. ATCHLEY ET AL  2,873,429
MAGNETIC ASSEMBLY HAVING GALVANOMETERS
PROVIDED WITH ADJUSTABLE LOCKS
Filed June 3, 1953
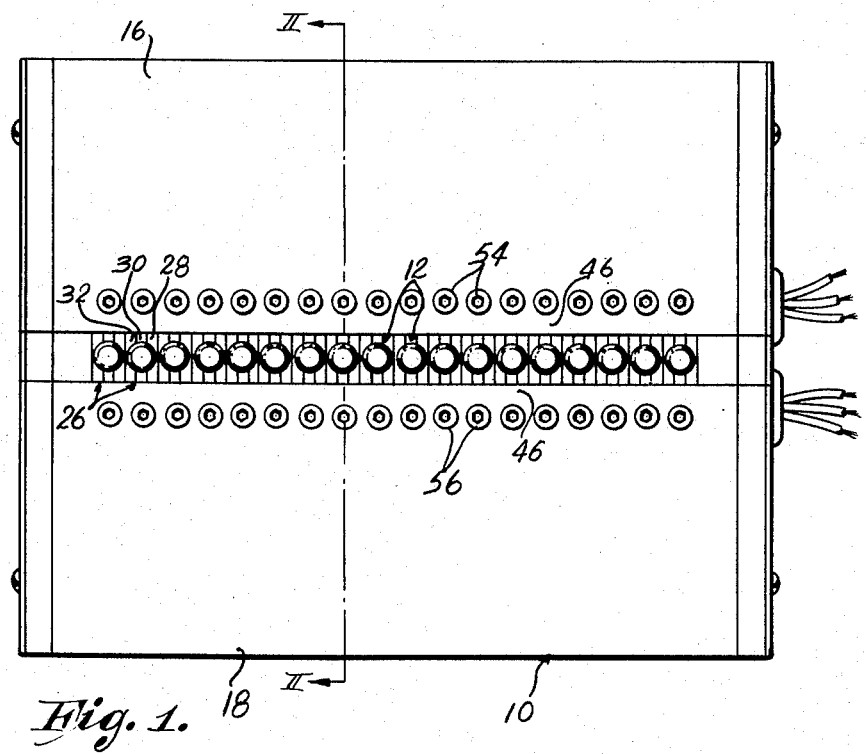
Fig. 1.
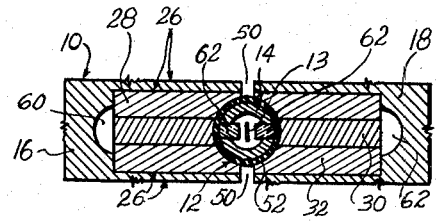
Fig. 3.
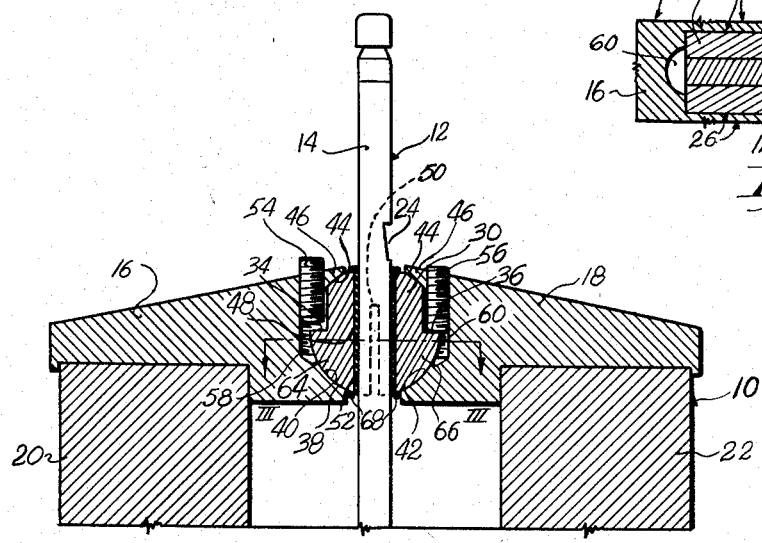
Fig. 2.
INVENTOR.
Raymond D. Atchley
Wayne E. Harrison
BY
ATTORNEY.

United States Patent Office 2,873,429
Patented Feb. 10, 1959

2,873,429
MAGNETIC ASSEMBLY HAVING GALVANOMETERS PROVIDED WITH ADJUSTABLE LOCKS

Raymond D. Atchley and Wayne E. Harrison, Tulsa, Okla., assignors to Midwestern Geophysical Laboratory, Tulsa, Okla., a corporation of Delaware Application June 3, 1953, Serial No. 359,294

6 Claims. (Cl. 324—154)

This invention relates to sensitive electrical instruments for detecting and measuring currents wherein a coil is suspended between the poles of a magnet for turning movement, the primary object being to provide improved support means permitting adjustment without affecting the coil itself or the filaments for suspending the same.

It is the most important object of the present invention to provide a galvanometer assembly having a bank of tubular galvanometers of the moving coil type mounted between the poles of a magnet structure and novel mounting structure to permit adjustment of the galvanometers individually with respect to the magnet whereby the reflections from the mirrors on the coil systems may be properly guided to recording film or photographic paper, or to other means of reading the deflection of the galvanometer.

Another important object of this invention is to provide mechanism for mounting a galvanometer between the pole pieces of a magnet structure capable of permitting adjustment of the galvanometer without reducing the amount of flux linking the coil so that the deflections thereof remain substantially proportional to the current in the coil in all adjusted positions of the galvanometer whereby the latter remains highly sensitive and a uniform scale is obtained.

A further object of the present invention is the provision of a mounting assembly for galvanometers that includes a mounting element having a core of soft iron or other material of high magnetic permeability in direct engagement with the pole pieces of the magnetic structure throughout all adjusted positions of the galvanometer, thereby eliminating the necessity of providing an air gap as has heretofore been necessary in structures of this type with a resultant decrease in the amount of flux linking the coils of the galvanometers and thereby decreasing the sensitivity thereof.

A still further object of this invention is to provide mounting structure for galvanometers that includes a mounting element that is cylindrical in form complementally with the configuration of the pole pieces between which it is mounted whereby the flux between the pole faces and the coil remains substantially radial throughout all adjusted positions of the galvanometer with respect to the magnet assembly.

One of the most important objects of the present invention is the provision of a magnet assembly having adjustable galvanometers wherein each galvanometer is individually shiftable, not only along a normally horizontal axis extending longitudinally through the bank, but on a substantially vertical axis extending longitudinally through each of the galvanometers.

It is an important aim of this invention to provide adjusting means for galvanometer assemblies taking the form of a clamping element that is not only rigidly held in any one of a number of selected positions with respect to the magnet assembly supporting the same, but which, when so set in the desired position of the galvanometer which it supports, operates to clamp the galvanometer itself in place and thereby hold the latter against movement with respect to the mounting element.

Other objects include the way in which the adjusting element takes the form of an oscillatable body having an arcuate edge slidably engageable with complemental faces on the pole pieces of the magnet; the way in which the said body is provided with a galvanometer receiving bore therethrough; the way in which the body is split through the bore to the end that when it is clamped in place the galvanometer will be tightly gripped and held against rotational movement; the way in which shoulders are provided on the galvanometer receiving element that are engageable by setscrews carried by the magnet assembly and easily accessible to the user; the way in which the clamping unit is made up of a number of laminations, one of which consists of the aforementioned iron core; the way in which stops are provided to limit the extent of swinging movement of the galvanometer in a vertical plane; and many more minor objects including important details of construction, all of which will be made clear as the following specification progresses.

In the drawing:

Figure 1 is a top plan view of a magnetic assembly having galvanometers provided with adjustable locks made pursuant to the present invention.

Fig. 2 is a fragmentary, enlarged, cross-sectional view taken on line II—II of Fig. 1; and Fig. 3 is a cross-sectional view still further enlarged taken on line III—III of Fig. 2.

A magnet structure broadly designated by the numeral 10 in the drawing, is of the type that is adapted to receive a bank of tubular galvanometers 12 disposed in a rectilinear row as is clear in Fig. 1. The particular form of the galvanometers 12 per se forms no part of the present invention and therefore, reference may be had, by way of example, to Patent No. 2,439,576, of April 13, 1948, in the name of M. E. Morrow, for a full and complete understanding of one type of galvanometer and may be used in the magnet structure 10 hereof, and particularly in connection with the adjustable locking means hereinafter to be fully described.

It is pointed out that galvanometers of this type are provided with a coil 13 mounted within a tubular case or barrel 14, preferably made from brass or other non-magnetic material. It is necessary that such coil, which is suspended for turning movement on the longitudinal axis of the case 14 by suitable filaments, be disposed between pole pieces 16 and 18 of permanent magnets 20 and 22, with window 24 within an opening in the side of the barrel 14 disposed above the pole pieces 16 and 18 as shown in Fig. 2.

Window 24 is in alignment with a mirror on the coil 13 within the barrel 14 that is used to transmit reflected light to a film or sensitized paper in the normal manner. In order to guide the reflections from the mirrors of the bank of galvanometers 12 properly to the means for reading the deflection of the coil 13 and the mirror, it is necessary to not only adjust the galvanometers 12 by tipping the same on a horizontal axis transversely thereof, but to rotate the barrels 14 slightly on their longitudinal, normally vertical axes.

The means for accomplishing these results herein provided consists of a small laminated body broadly designated by the numeral 26, and including laminae 28, 30 and 32, the centermost of which, designated by the numeral 30, consists of a core of soft iron or other material of high magnetic permeability, the two outermost plate-like laminae 28 and 32 being made from brass or other non-magnetic material. The advantage of making the outermost portions 28 and 32 of the lamination out of non-magnetic material is to induce a flux concentration between pole faces or edges 40 and 42 of the magnetic structure 10 and the galvanometers 12. The area of the flux path is reduced and, therefore, the flux density across the reduced area must increase. The three layers 28, 30 and 32 may be bonded or otherwise interconnected as a composite unit.

The mounting element 26 is provided with a pair of opposed, upwardly facing shoulders 34 and 36 disposed radially with respect to a semi-circular edge 38 joining the same. Edge 38 is complemental with the arcuate surfaces of edges 40 and 42 extending longitudinally along the opposed innermost surfaces of pole pieces 16 and 18 respectively. The flat uppermost end of the element 26 is likewise arched as at 44 concentrically with the axis of the semi-circular edge 38, and fitting complementally beneath overhanging portions 46 forming a part of the pole pieces 16 and 18.

It is now seen that the elements 26 are rotatably or oscillatably mounted between the pole pieces 16 and 18 for movement on the axis of edge 38 and arcuate portions 44 transversely of the galvanometers 12. It is of utmost importance to note that the three layers 28, 30 and 32, and particularly core 30, remain in direct sliding contact with the pole pieces 16 and 18 at all times. Pole pieces 16 and 18 are sufficiently spaced apart beneath edges 40 and 42 thereof and between overhanging portions 46 to permit swinging movement of the galvanometers 12 when the latter are disposed within central bores 48 extending through the elements 26. Body 26 is transversely split as at 50 through the bore 48 thereof and a bushing 52 made preferably from hard rubber, surrounds the barrel 14 within the bore 48.

The sides of the elements 26 are planar and it is noted in Figs. 1 and 3 of the drawing that elements 26 are disposed in side-by-side, relatively sliding relationship, but each element 26 and its galvanometer 12 is separately adjustable through the medium of setscrews 54 and 56 extending into internally threaded openings 58 and 60 within pole pieces 16 and 18 respectively. Each element 26 and therefore, each galvanometer 12, is provided with a pair of setscrews 54 and 56 which normally bear against the shoulders 34 and 36 respectively to hold the elements 26 against rotational movement on a horizontal axis through the coils 13 and between pole piece inserts 62 forming a part of the galvanometers 12, and preferably made from iron or other magnetic material.

It can now be seen that through relative adjustments of the screws 54 and 56, galvanometers 12 may be tilted in one direction within parallel, vertical planes transversely of the magnet structure 10, and when both setscrews 54 and 56 are brought into engagement with the shoulders 34 and 36, the element 26 will be brought into tight clamping relationship to the galvanometer barrels 14. This clamping action takes place by virtue of the inherent resiliency of the material from which the elements 26 are made and because of the fact that the splitting of the element 26 as at 50, presents a pair of opposed legs 64 and 66 on opposite sides of the galvanometers 12. When the setscrews 54 and 56 are retracted, the legs 64 and 66 spring apart permitting rotation of the barrels 14 on their longitudinal, vertical axes for adjustment purposes as above explained. Screws 54 and 56 therefore, not only hold the galvanometers 12 in adjusted positions with respect to tilting movement in vertical planes, but with respect to rotational movement on their longitudinal axes. The tilting adjustment may be limited by the provision of stops 68 on the elements 26 and engageable with the pole pieces 16 and 18.

It is clear from Fig. 1 of the drawing, that all of the screws 54 and 56 are readily accessible to the operator and that the adjustments herein contemplated may be made without removing the galvanometers 12, disassembling the magnetic assembly 10 or handling the mounting elements 26 in any manner whatsoever. Furthermore, it is a simple matter to replace the galvanometers 12 since, upon loosening the screws 54 and 56, the barrels 14 will readily slip from place within the bushings 52.

Having thus described the invention what is claimed as new and desired to be secured by Letters Patent is:

1. In a current responsive instrument having an elongated, tubular galvanometer and a magnet provided with a pair of spaced poles, structure for mounting the galvanometer on the magnet comprising a pole piece for each pole respectively and adapted for attachment to the latter in spaced relationsihp, each pole piece having a concave innermost edge; a mounting element rotatably carried by the pole pieces therebetween and provided with a pair of opposed legs, said element having convex edges complementally engaging said concave edges of the pole pieces, and being provided with an opening adapted to rotatably receive said galvanometer; and releasable means engaging said legs for holding the element against rotation relative to the pole pieces and clamping the legs against the galvanometer when the latter is in the opening.

2. In a current responsive instrument having an elongated, tubular galvanometer and a magnet provided with a pair of spaced poles, structure for mounting the galvanometer on the magnet comprising a pole piece for each pole respectively and adapted for attachment to the latter in spaced relationship, each pole piece having a concave innermost edge; a mounting element of resilient material rotatably carried by the pole pieces therebetween, said element having convex edges, concentric with its axis of rotation and complementally engaging said concave edges of the pole pieces, and being provided with an opening intersecting said axis and adapted to receive said galvanometer for rotation of the latter relative to the element about an axis, perpendicular to said axis of rotation of the element and coincident with the longitudinal axis of the galvanometer, said element being partially split at said opening, presenting a pair of legs, each leg having one of said convex edges thereon; and means carried by each pole piece respectively and engaging said legs for first rocking the element about its said axis and thereupon compressing said legs toward each other into clamping relationship to the galvanometer when the latter is in the opening.

3. In a current responsive instrument having an elongated, tubular galvanometer and a magnet provided with a pair of spaced poles, structure for mounting the galvanometer on the magnet comprising a pole piece for each pole respectively and adapted for attachment to the latter in spaced relationship, each pole piece having a concave innermost edge; a mounting element of resilient material rotatably carried by the pole pieces therebetween, said element having convex edges, concentric with its axis of rotation and complementally engaging said concave edges of the pole pieces, and being provided with an opening intersecting said axis and adapted to receive said galvanometer for rotation of the latter relative to the element about an axis, perpendicular to said axis of rotation of the element and coincident with the longitudinal axis of the galvanometer, said element having a pair of opposed side slits at the lowermost end thereof communicating with said opening, presenting a pair of legs, each leg being provided with an upwardly-facing shoulder and having one of said convex edges thereon the slits being between the shoulders; and setscrew means carried by each pole piece respectively and engaging said shoulders of the legs for first rocking the element about its said axis and thereupon compressing said legs toward each other into clamping relationship to the galvanometer when the latter is in the opening.

4. In a current responsive instrument, the combination of a magnet having a pair of pole pieces provided with spaced, concave edges; a substantially circular element carried by said pole pieces therebetween and slidably engaging said edges for rotation about an axis concentric with the latter, said element having an opening therethrough intersecting said axis; an elongated, tubular galvanometer between the pole pieces and extending through said opening for rotation with said element about said axis, and rotation relative to the element about the longitudinal axis of the galvanometer, said axes being relatively perpendicular; and means engaging said element for rocking the latter about the first mentioned axis, said element being provided with a pair of opposed, radial shoulders, said means comprising a member engaging each shoulder respectively.

5. In a current responsive device as set forth in claim 4, wherein said members comprise setscrews, each carried by a corresponding pole piece.

6. In a current responsive device as set forth in claim 4, said element having a pair of opposed side slits at the lowermost end thereof communicating with said opening, the slit being between the shoulders whereby the element is clamped against the galvanometer when the members are forced against the shoulders simultaneously, whereby to hold the galvanometer against rotation within the opening.

References Cited in the file of this patent

UNITED STATES PATENTS

| | | |
|---|---|---|
| 2,149,442 | Kannenstine | Mar. 7, 1939 |
| 2,389,081 | Redmond | Nov. 13, 1945 |
| 2,469,265 | Hathaway | May 3, 1949 |
| 2,535,065 | Heiland | Dec. 26, 1950 |
| 2,698,417 | Hathaway | Dec. 28, 1954 |